United States Patent [19]

Marzullo et al.

[11] Patent Number: 5,171,980
[45] Date of Patent: Dec. 15, 1992

[54] SELF ADJUSTING SCANNER APPARATUS MAINTAINING SCAN DISTANCE

[75] Inventors: Joseph H. Marzullo, Brookfield; Franklin J. Buckley, Bethel, both of Conn.

[73] Assignee: Pitney Bowes Inc., Stamford, Conn.

[21] Appl. No.: 738,962

[22] Filed: Aug. 1, 1991

[51] Int. Cl.⁵ ............................ G01N 9/04; H01J 5/02
[52] U.S. Cl. ............................ 250/223 R; 250/239
[58] Field of Search ............ 250/223 R, 561, 557, 250/548, 234, 559, 239

[56] References Cited

U.S. PATENT DOCUMENTS

| | | | |
|---|---|---|---|
| 3,273,446 | 9/1966 | Goetz et al. | 88/1 |
| 3,735,094 | 5/1973 | Dunn | 235/61.11 E |
| 3,763,352 | 10/1973 | Del Rio et al. | 235/61.11 E |
| 3,857,020 | 12/1974 | Higginbotham et al. | 235/61.11 E |
| 3,886,371 | 5/1975 | Lloyd | 250/567 |
| 3,919,561 | 11/1975 | Coberley | 250/548 |
| 4,027,155 | 5/1977 | Rappaport | 250/561 |
| 4,029,944 | 6/1977 | Trenkamp | 235/61.11 D |
| 4,245,151 | 1/1981 | Thomas | 235/454 |
| 4,260,880 | 4/1981 | Thomas | 235/454 |
| 4,277,689 | 7/1981 | Thomas et al. | 250/567 |
| 4,600,185 | 2/1986 | Moll | 250/561 |
| 4,603,261 | 7/1986 | Robertson et al. | 250/566 |
| 4,647,768 | 3/1987 | Ohta | 250/227 |
| 4,672,184 | 6/1987 | Fujiwara et al. | 235/462 |
| 4,687,352 | 8/1987 | Igi et al. | 400/73 |
| 4,738,442 | 4/1988 | Rodi et al. | 250/561 |
| 4,764,976 | 8/1988 | Kallin et al. | 382/65 |
| 4,784,359 | 11/1988 | Westover | 248/274 |

Primary Examiner—David C. Nelms
Assistant Examiner—Michael Messinger
Attorney, Agent, or Firm—Charles R. Malandra, Jr.; Melvin J. Scolnick

[57] ABSTRACT

In an inserter including a support member rigidly extending transversely over a paper path in the inserter, a self adjusting document scanning apparatus includes a scanner having a scan head and structure for mounting the scanner to the support member. The mounting structure is operatively coupled to the support member so as to allow position adjustments of the scanner in the transverse direction. The mounting structure also provides a fixed reference for the upward movement of the scanner. There is linkage for coupling the scanner to the mounting structure. The linkage holds the scanner stationary in longitudinal and transverse directions and allows downward-upward movement of the scanner. Paper guides are operatively coupled to the scanner for maintaining a fixed distance between the scan head and a sheet of paper being scanned. The paper guides, the linkage and the mounting structure cooperatively control movement of the scanner whereby the scan head remains parallel to the paper path and is a fixed distance from the sheet when the sheet is being scanned.

14 Claims, 5 Drawing Sheets

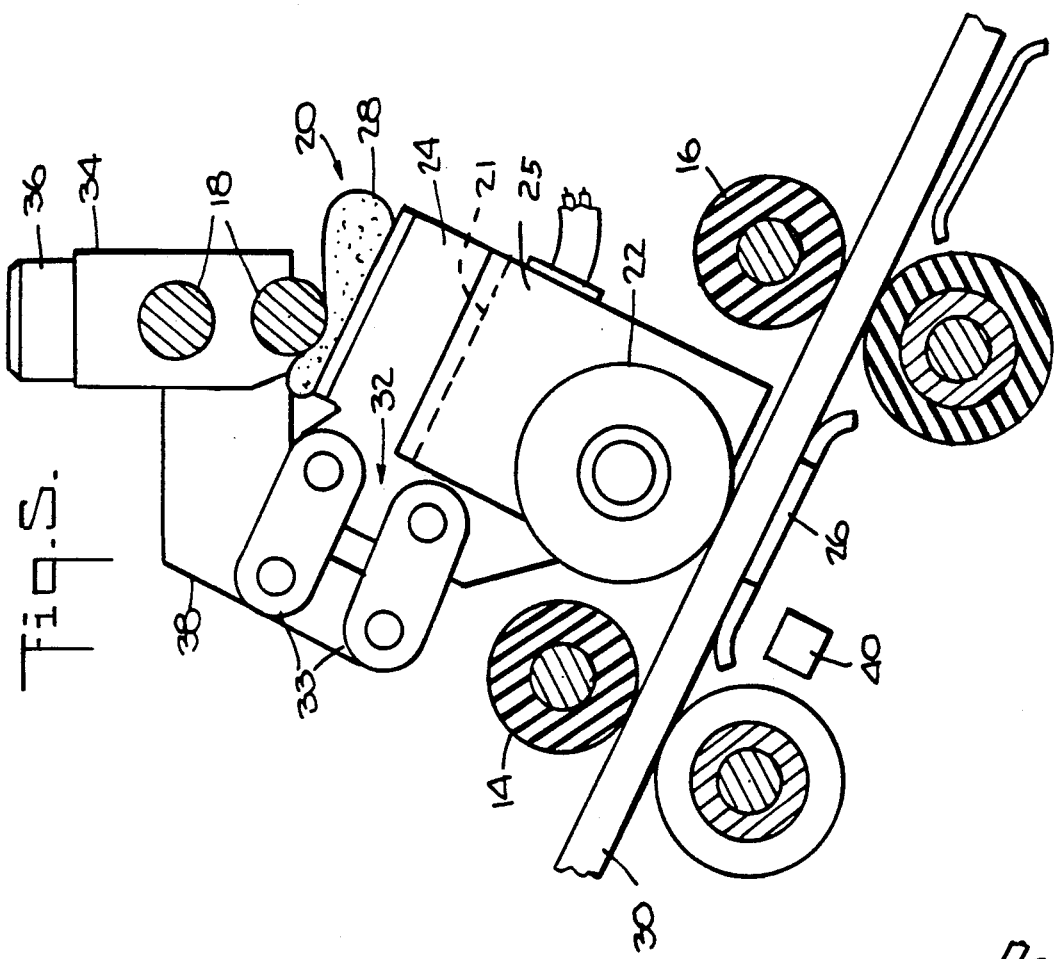
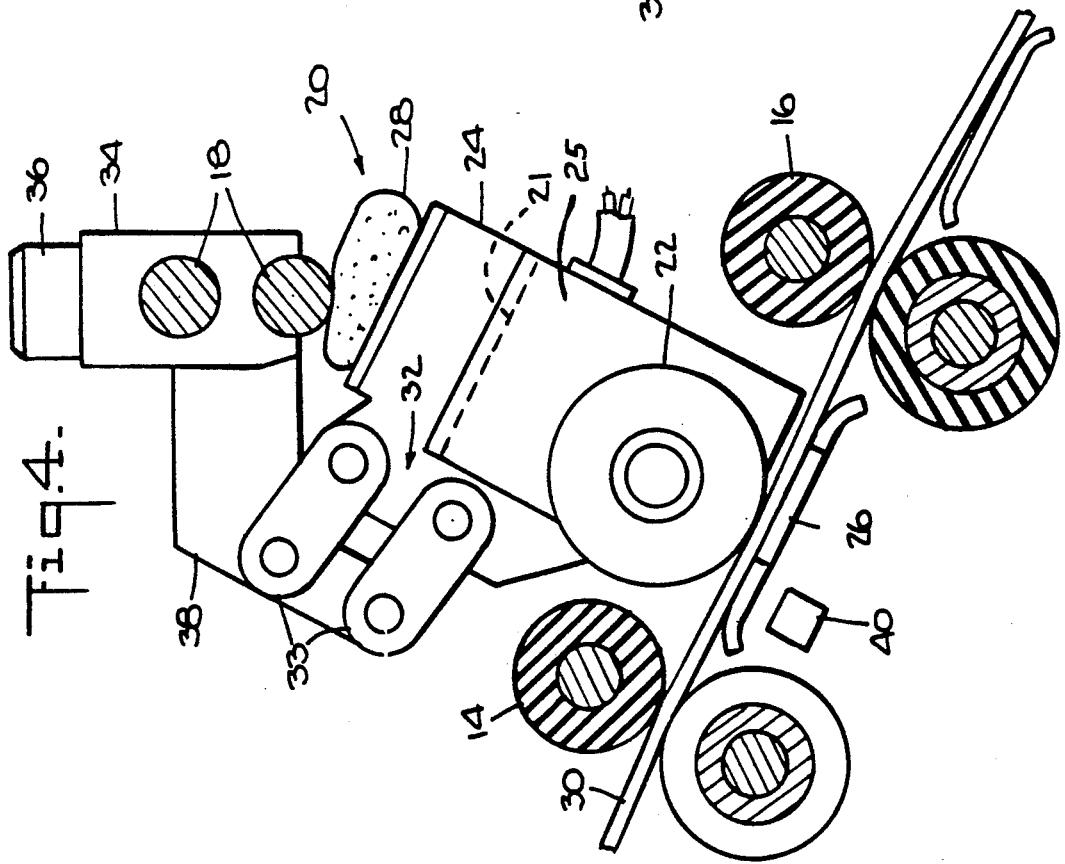

SELF ADJUSTING SCANNER APPARATUS MAINTAINING SCAN DISTANCE

FIELD OF THE INVENTION

This invention relates to optical scanners and more particularly, to the use of optical scanners in inserters.

BACKGROUND OF THE INVENTION

Photodetection of indicia on forms and the like is known. In such systems, a narrow beam of light is focused as a spot or slit of light on the relevant field to be scanned and is moved over the field, either by the deflection of the beam or movement of the form. Light reflected from, or transmitted through, the form is focused on a photocell or other photodetector so that indicia may be detected as variations in the photocell output. Typically, photocell outputs are small so that the photocell is connected to an amplifier and the amplified output is further processed by the system.

One application of photodetection is in the control of inserter systems, which separate and process discrete documents, assemble the documents and other materials into batches to be mailed together and insert the batches into envelopes. Inserting systems are typically controlled according to information, for example "dash codes", encoded on control documents. Dash codes consist of lines, normal to the direction of motion of the printout, which are printed on the control document, typically on the sprocket strips of the printout. The field containing the dash codes is scanned by reflected light as the control document is received by the inserter system and the presence or absence of lines of encoded information defines the operations relating to that control document.

A scanning apparatus used in conjunction with inserting machines having various document feeders is known as an "optical machine reader" or OMR. The OMR requirement for inserting machines has existed for some time and optical scanner technology has developed to satisfy this requirement. For example, in U.S. Pat. No. 4,659,939 issued to John L. Lorenzo on Apr. 21, 1987 and assigned to the assignee of the present invention, there is disclosed an optical scanning system, commonly referred to as an OMR scanner, including an amplifier which automatically adjusts the background reference level and a photodetector which detects light reflected from or transmitted through objects such as code markings on forms. It is well known to use such an OMR scanner in conjunction with document feeders in console inserter systems.

Typically, the scanner is rigidly mounted to the document feeder of the inserter and has to be adjusted in relationship to the sheet being scanned. The physical adjustment to the location of the scanner is a two-way adjustment which depends on the type of material being scanned. In the transverse direction to the paper path, the scanner is positioned over the area in which the dash codes will pass. The second adjustment is to the distance from the sheet containing the dash codes to the lens of the scanner. For both adjustments, the proper positioning of the scanner is essential to ensure the integrity of the scanned information. For inserts, adjustments to the scanner position are usually required whenever the different weighted paper is being scanned or the location of the code on the sheet is changed. Typically, scanner adjustments are expected to be long term and require service technicians to perform the adjustments.

OMR scanners have been used in console inserters, such as the 8300 series inserter of Pitney Bowes, which typically are used to handle large jobs or "runs" consisting of an extensive number of items of the same material with uniform dimensions. As a result, an adjustment of a rigidly mounted scanner by a service technician is not considered to be a problem with console inserters because such adjustments are made infrequently. Generally, once the scanner has been adjusted to a correct position, further adjustments are necessary only when the material being scanned or the location of the control code is changed. Although the OMR scanners perform suitably on the console inserting machines, some of the control codes are missed or misread for various reasons. For example, if the control document is curled or the document is fluttering as it is scanned, the rigidly mounted scanner may misread the control code. Typically, an OMR scanner is designed to scan a certain field of view which requires that the scanned document be within this field of view, such as 0.020 inches, plus or minus a limited tolerance.

Up to now, OMR scanners have seldom been used in tabletop inserters because, typically, tabletop inserters are not used for the uniform, consistent applications such as the console inserters. Tabletop inserters are generally used in limited and variable types of runs, i.e., many runs consisting of different types of material. The use of OMR scanners on tabletop inserters has not been practical up to now because every time the material changes a new adjustment is needed to the position and distance of the scanner to the paper path of the document containing the control codes. However, the requirements for the use of tabletop inserters are becoming more sophisticated and a need for OMR scanning on tabletop inserters is now at hand.

SUMMARY OF THE INVENTION

It has been discovered that a modular approach to an OMR scanner is suitable for use on tabletop inserting machines. In accordance with the present invention, the use of an OMR module provides the capability to scan with an OMR scanner without the requirement or necessity to adjust the distance of the scanner to the document. Furthermore, it has been found that the modular OMR scanner improves the reliability of the scanning in console inserting machines.

In accordance with the foregoing, in an inserter including a support member rigidly extending transversely over a paper path in the inserter, a self adjusting document scanning apparatus comprises a scanner having a scan head and means for mounting the scanner to the support member. The mounting means is operatively coupled to the support member so as to allow position adjustments of the scanner in the transverse direction. The mounting means also provides a fixed reference for the upward movement of the scanner. There is also linkage means for coupling the scanner to the mounting means. The linkage means holds the scanner stationary in longitudinal and transverse directions and allows downward-upward movement of the scanner. Paper guide means is operatively coupled to the scanner for maintaining a fixed distance between the scan head and a sheet of paper being scanned. The paper guide means, the linkage means and the mounting means cooperatively control movement of the scanner whereby the scan head remains parallel to the paper path and is a fixed distance from the sheet when the sheet is being scanned.

BRIEF DESCRIPTION OF THE DRAWINGS

A complete understanding of the present invention may be obtained from the following detailed description of the preferred embodiment thereof, when taken in conjunction with the accompanying drawings wherein like reference numerals designate similar elements in the various figures and, in which

FIG. 4 is another side view of the OMR module of FIG. 2 with a sheet passing under the OMR module;

FIG. 5 is another side view of the OMR module of FIG. 2 with thick collation passing underneath the OMR module;

DETAILED DESCRIPTION OF THE INVENTION

Figure 1:
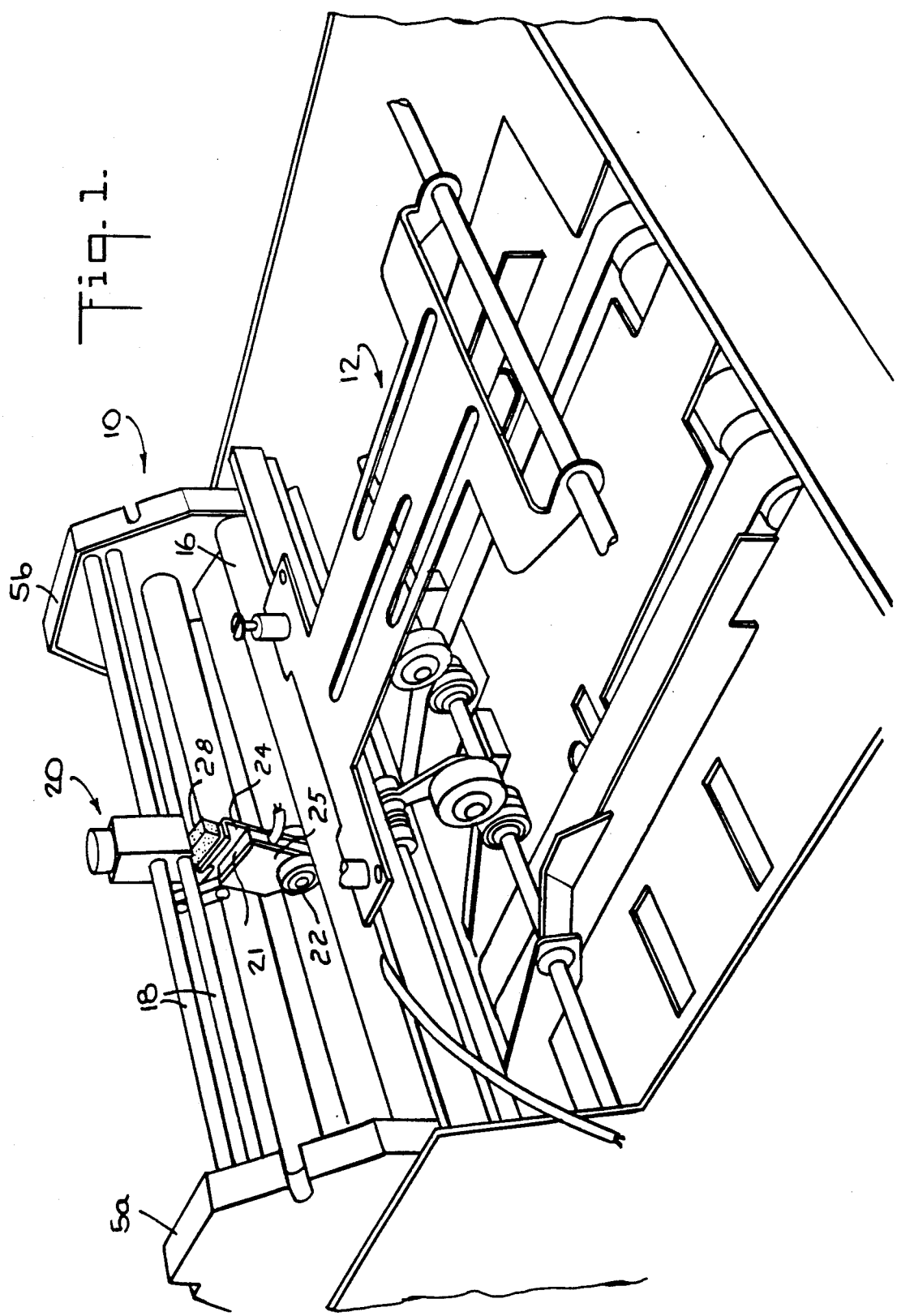
FIG. 1 is a perspective view of the downstream portion of a document feeder with an OMR module mounted thereto.

In describing the preferred embodiment of the present invention, reference is made to the drawings wherein there is seen in FIG. 1 a downstream end of a document feeder for a tabletop inserting machine comprising an OMR station 10 and a queuing station 12. The OMR station 10 is located between frame members 5a and 5b and includes an OMR unit 20, a pair of rollers 14 which convey documents fed from a feeder module (not shown) and a second pair of rollers 16 which convey the documents to queueing station 12 where registration of the documents is achieved before the documents are transported for further processing. OMR unit 20 is mounted to a pair of shafts 18 which are transversely mounted to frame members 5a and 5b. An example of the feeder module is described in detail in U.S. patent application Ser. No. 617,238, filed Nov. 21, 1990 and assigned to the assignee of the present invention.

Figure 2:
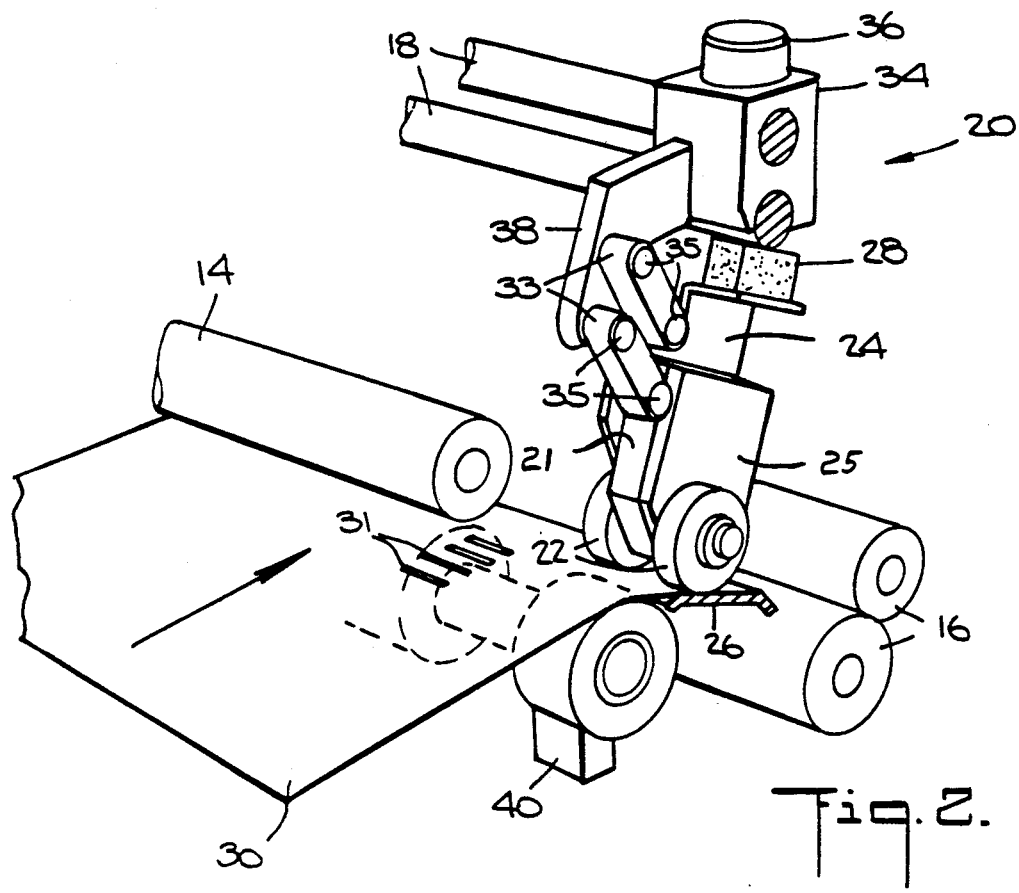
FIG. 2 is another perspective drawing of parts of the feeder of FIG. 1 with the OMR module in accordance with the preferred embodiment of the present invention.
Figure 3:
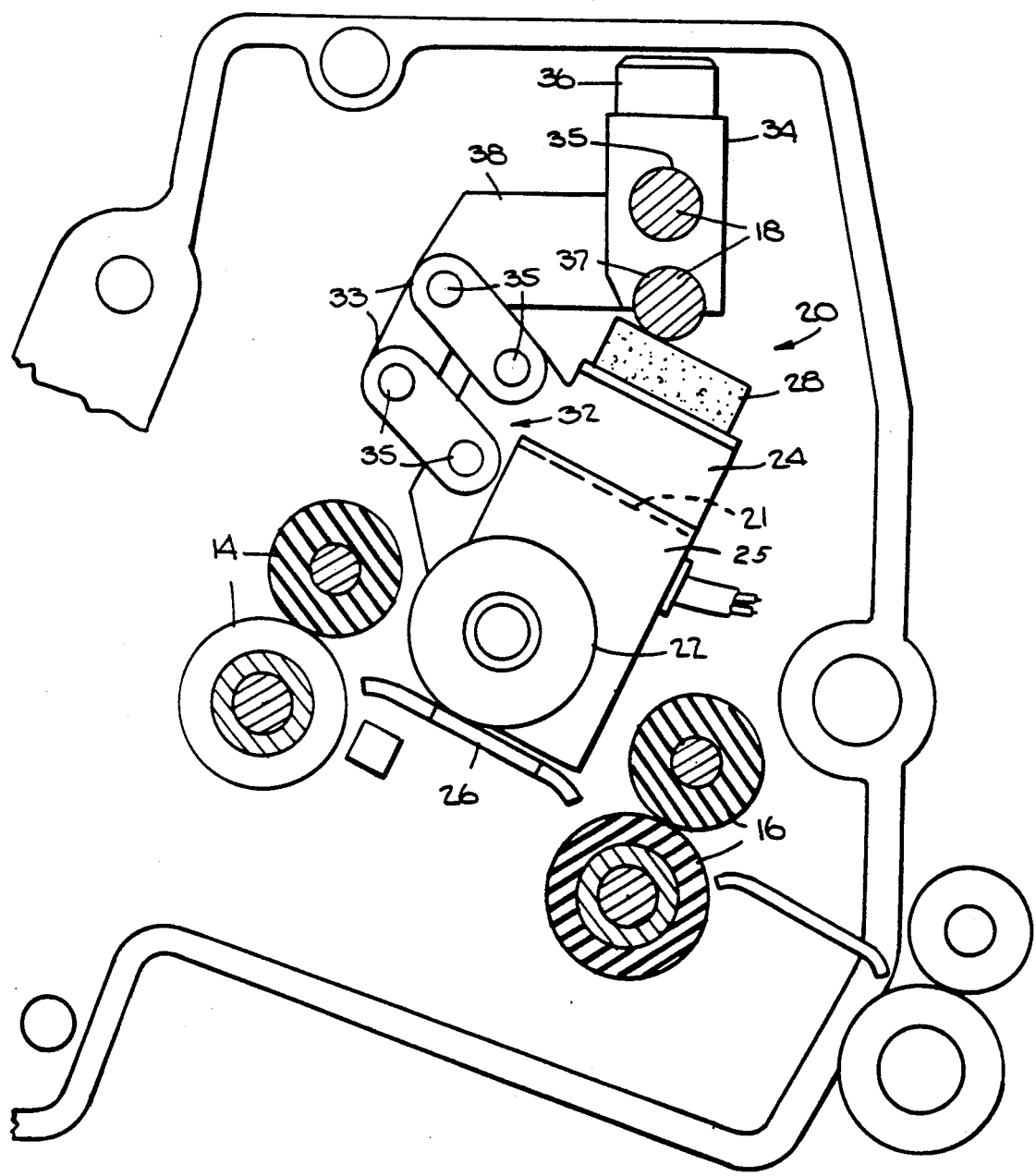
FIG. 3 is a side view of the OMR module of FIG. 2 mounted in the feeder of FIG. 1.

OMR unit 20 is configured as a modular arrangement. It has been found that the OMR modular arrangement is suitable for use with tabletop and console inserting machines and improves the reliability in the scanning of single sheets or piles of sheets. Referring now to FIGS. 2 and 3, the modular arrangement of OMR unit 20 comprises generally a rigidly constructed box consisting of a pair of side plates 24 and 25 having an OMR scanner 21 mounted within. A pair of wheels 22 are rotatably mounted in a conventional manner to side plates 24 and 25. Wheels 22 are biased towards deck 26 as a result of dampening device 28, which is described below, such that wheels 22 are always in contact with sheets of paper 30, regardless of the thickness of an individual sheet or a stack of sheets. In the preferred embodiment of the present invention, the scanner 21 is a "Lorenzo" scanner 3184601 manufactured by Pitney Bowes Inc. of Stamford, Conn.

OMR unit 20 is mounted to a pair of shafts 18 by mounting member 34 which comprises an orifice 35 which is slidably mounted on the upper shaft. The lower end of member 34 has a slot 37 which fits over the lower shaft to stabilize the mounting of OMR unit 20. There is a screw 36 which can be tightened against upper shaft 18 to secure OMR unit 20 to a fixed position along shafts 18.

Four-bar linkage 32 is connected at one end to mounting member 34 by an extended member 38. The other end of four-bar linkage 32 is connected to a portion of side plate 24 which extends beyond the mounted scanner 21. Coupling OMR scanner 21 to four-bar linkage 32 in this manner serves two key functions. Linkage 32 permits scanner 21 to move up and down so that scanner 21 can maintain a critical field of view regardless of the thickness of the sheets being scanned. Linkage 32 also maintains scanner 21 in parallel orientation to the sheets being scanned as scanner 21 moves up and down to compensate for the thickness of the sheets. Four-bar linkage 32 is a conventional type of linkage comprising four side plates 33 which rotate freely on four axles 35. Linkage 32 maintains a constant read angle as document 30 passes under scanner 21. It will be understood that any other linkage which maintains parallel orientation and allows up and down motion can be used to in place of four-bar linkage 32.

Figure 6:
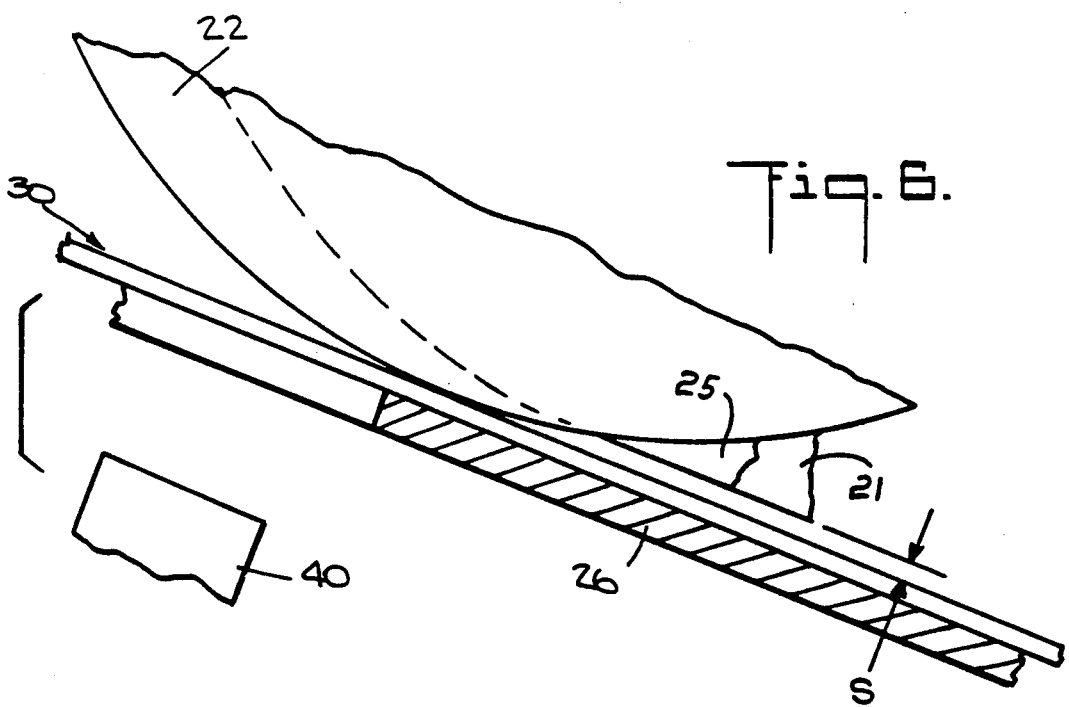
FIG. 6 shows an enlarged portion of the wheel in the OMR module of FIG. 2. in relation to the deck as the sheet passes under the OMR module.

In FIG. 6, an enlarged view shows that there is a parallel relationship among side plates 24 and 25, acting as a paper guide, the bottom end of scanner 21 and the sheets of paper 30. Wheels 22 maintain a gap "S" between the top sheet 30 being scanned and the bottom of scanner 21. It will be understood by those skilled in the art that maintaining this parallel relationship and gap is an essential part to the present invention. Side plates 24 and 25 and linkage 32 maintain the parallel relationship between scanner 21 and sheets 30, and wheels 22 maintain the critical gap or field of view, thereby providing the optimum capability for scanner 21 to read the control codes on sheets 30. It will be understood that means other than wheels 22 can be used to maintain gap "S", for example, a curved plated mounted below scanner 21.

Dampening device 28 is mounted to the top of scanner 21 for the twofold purpose of biasing the scanner towards deck 26 and dampening any up and down movement of scanner 21 as scanner unit 20 maintains the field of view for various thicknesses of paper. FIG. 4 shows OMR unit 20 when a thin sheet or stack of sheets 30 is being scanned. Dampening device 28 is only slightly compressed when wheels 22 raise OMR unit to accommodate the thickness of the sheets. This can be contrasted to FIG. 5 which shows OMR unit 20 scanning a thicker sheet or stack of sheets 30. In FIG. 5, dampening device 28 is compressed to a greater extent than in FIG. 4. It will be understood by those skilled in the art that the present invention provides the flexibility to accommodate collations of various thicknesses. As previously stated, four-bar linkage 32 maintains the scan head parallel to sheet or stack of sheets 30 conveyed under scanner 21.

Wheels 22 follow the profile of the paper as sheet 30 passes under the scan head of scanner 21. Wheels 22 are sized and positioned so as to engage the sheets 30 before the leading edge of the sheet 30 passes under scanner 21. At the same time, wheels 22 maintain a fixed distance S between the scan head and the top sheet of the collation. It is important, in particular for light-weighted sheets, that the size and material of wheels 22 are properly selected to avoid excessive friction which can cause crumpling of sheet 30.

In the preferred embodiment of the present invention, the wheels 22 are made of a polycarbon plastic, such as Delran manufactured by DuPont of Wilmington, Del. Wheels 22 have a diameter of 0.940 inches. The top feed and take-away rollers, 14 and 16 respectively, have a diameter of 0.625 inches and the lower feed and take-away rollers have a diameter of 0.829 inches. The dimensions and material specified above are suitable for the preferred embodiment which is configured to handle a stack of sheets up to 0.100 inches thick and single sheets having weights between 16# and 90#. It will be understood by those skilled in the art, that the sizes of the rollers and wheels may be increased to accommodate stacks of greater thicknesses.

It is well known that scanners have a critical field of view which must be maintained during the scanning operation to facilitate accurate reads. For example, the Lorenzo scanner used in the preferred embodiment of the present invention has a critical field of view of 0.020 inches or less. In the preferred embodiment of the present invention, wheels 22 are positioned so that gap S between sheets 30 and scanner 21 is 0.015 inches. Accordingly, because wheels 22 hold sheets 30 flat during the scanning operation, the problems typically heretofore affecting the field of view, e.g., curling or fluttering of the sheets, are avoided.

It has been found that the present invention requires a one time adjustment by the operator to position the OMR unit 20 transversely along shafts 18 for reading the control code 31. No further adjustment is needed regarding thickness of material being scanned. The OMR unit 20 is self-adjusting with regard to various thickness of material. The cooperative control of the movement of the scanner by four-bar linkage 32, wheels 22 and dampening device 28 provides the self-adjustment feature of OMR unit 20.

In operation, document 30 is conveyed by pair of rollers 14 to OMR unit 20 which scans for the control code 31 printed on document or collation 30. When sensor 40 detects the presence of document 30, the scanning function is initiated. Typically, scanner 21 is remains on during the entire process, but the recognition of the control code is activated only after the leading edge of document 30 has been detected by sensor 40. As document 30 enters the nip of wheels 22 and deck plate 26, document 30 is fed underneath roller 22, whereby roller 30 rolls over the top of document 30 maintaining a fixed distance between the scanner and document 30 regardless of the thickness of the document. Side plates 24 and wheels 22 are shaped and assembled to prevent document 30 from crashing into the upstream end of scanning unit 20. For a collation of documents, wheels 22 rotate to the top of the collation whereby scanner 21 moves upward. Four-bar linkage 32 maintains the parallel alignment of scanner 21 to document 30. Dampening material 28 absorbs the upward movement of scanner 21 to minimize the effect the movement can have on the scanning. Take-away rollers 16 remove document 30 away from the scanning unit 20.

In accordance with the present invention, the modular design and mounting of the scanner provides a self adjusting scanner device which can be used in table top inserters or console inserters without the need for service technician adjustments whenever a different "run" is set up or whenever different material is being scanned.

Figure 7:
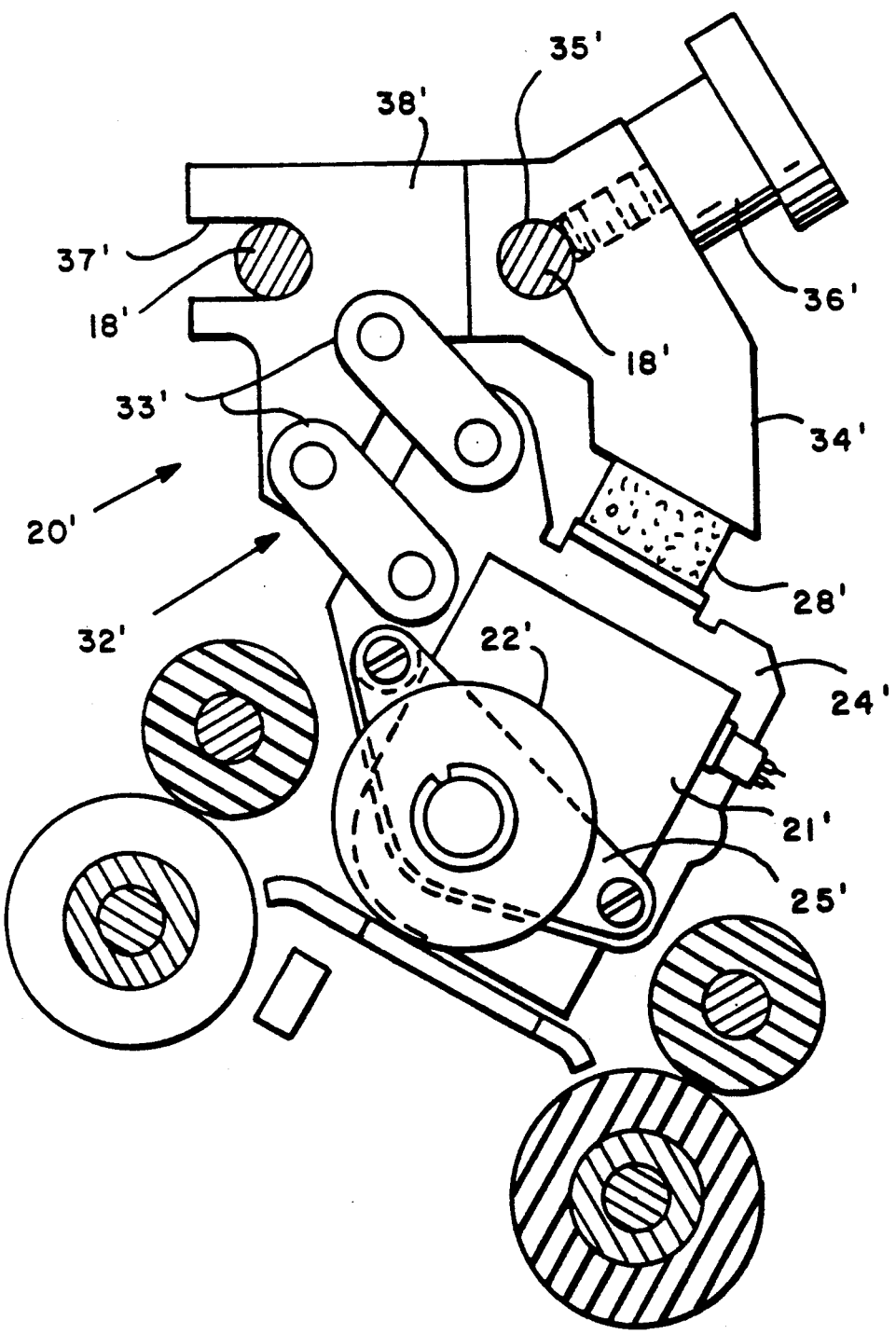
FIG. 7 is a side view of an alternate embodiment of the OMR of the present invention.

Referring now to FIG. 7, an alternate embodiment of the present invention provides an alternate shape of mounting member 34'. The alternate shape of member 34' includes horizontal orientation between orifice 35' and slot 37' for mounting OMR module 20' on a pair of horizontal mounting shafts 18'. Screw 36' provides means for positioning OMR module 20' along shafts 18'. The mounting of OMR module 20' to horizontal shafts 18' is preferred for handling a wider range of material being scanned because it reduces or eliminates any twisting movement that may occur at the mounting locations along shafts 18'. FIG. 7 also shows an alternate shape for side plate 25'. The alternate shape provides a reduction in the size from side plate 25, thus reducing the weight of module 20.

The present invention is suitable for handling individual sheets or stacks of sheets 30 being conveyed at a high speed for table top inserters, for example, 76 inches per second. As previously stated, dampening device 28 dampens the up and down movement of scanner 21 as the sheets are conveyed under wheels 22. In the preferred embodiment of the present invention, a rectangularly shaped spongy material 28 is used to dampen out any flutter or chatter that may be inherent when the sheets or collations enter the nip of wheels 22. An example of the block of spongy material 28 is closed cell foam manufactured by Ilbruck of Minneapolis, Minn. It will be understood by those skilled in the art that other dampening material or devices, for example spring bias arrangement, could be used to produce the dampening effect.

It will be appreciated that there has been provided in accordance with the present invention a self adjusting scanning apparatus that fully satisfies the objects aims and advantages set forth above. While the invention has been described in conjunction with specific embodiments thereof, many alternatives, modifications and variations will be apparent to those skilled in the art. Accordingly, it is intended to embrace all such alternatives, modifications and variations that follow within the spirit and scope of the appended claims.

What is claimed is:

1. In an inserter having at least one support member rigidly extending transversely over a paper path in the inserter, a self adjusting document scanning apparatus comprising:

a scanner having a scan head;

means for mounting said scanner to the support member, said mounting means including means for adjustably positioning said scanner along the support member, said mounting means also providing a fixed reference for the upward movement of said scanner;

linkage means for coupling said scanner to said mounting means, said linkage means maintaining orientation of said scanner in longitudinal and transverse directions and allowing downward-upward movement of said scanner; and paper guide means operatively coupled to said scanner for maintaining a fixed distance between said scan head and a sheet of paper being scanned.

2. The apparatus according to claim 1 wherein said paper guide means, said linkage means and said mounting means cooperatively control movement of said scanner whereby said scan head remains parallel to the paper path and is a fixed distance from the sheet when the sheet is being scanned.

3. The apparatus according to claim 1 wherein said linkage means comprises a plurality of links each of said links being pivotally connected at one end to said scanner and at the other end pivotally connected to said mounting means.

4. The apparatus according to claim 1 wherein said mounting means comprises a mounting member having an orifice suitable for slidably mounting said mounting member to the support member.

5. The apparatus according to claim 4 wherein said said mounting means further comprises a securing mechanism for locking said scanner in a transverse position along the support member.

6. The apparatus according to claim 4 wherein said mounting member has a groove at one side of said mounting member for engaging a second support member.

7. The apparatus according to claim 1 wherein said paper guide means comprises a pair of side plates, each of said side plates being mounted to opposite sides of said scanner in manner that the bottom edges of said side plates act as paper guides whereby the sheets of paper being conveyed for scanning pass under said scanner.

8. The apparatus according to claim 7 wherein said paper guide means further comprises a pair of wheels, each of said wheels being rotatably connected to one of said side plates in a manner such that the outer edge of each of said wheels extends beyond the bottom edge of each of said side plates whereby said wheels maintain said fixed distance between said scan head and the sheets of paper being scanned.

9. The apparatus according to claim 1 wherein said paper guide means comprises a pair of wheels, each of said wheels being operatively coupled to said scanner in a manner so that said wheels maintain a fixed distance between said scan head and the sheets of paper being scanned.

10. The apparatus according to claim 1 further comprising means for dampening the downward and upward movement of the scanner as the sheets of paper are being scanned.

11. The apparatus according to claim 10 wherein said dampening means comprises foam material affixed to the top of said scanner.

12. A method for making a scanning apparatus self adjusting whereby the scanning apparatus compensates for scanning sheet material of various thicknesses being conveyed along a material path, comprising the steps of:
    a) securing a mounting member to a shaft transversely positioned over the material path;
    b) connecting a scanner to said mounting member by a linkage device comprising at least four links; and
    c) mounting a pair of wheels to opposite sides of said scanning apparatus in a manner so that said wheels maintain a fixed distance between said scanner and the sheet material.

13. The method according to claim 12 further comprising the step mounting dampening material to the top of said scanner.

14. In an inserter including a support member rigidly extending transversely over a paper path in the inserter, a self adjusting document scanning apparatus comprising:
    a scanner having a scan head;
    means for mounting said scanner to the support member, said mounting means operatively coupled to the support member so as to allow position adjustments of said scanner in the transverse direction, said mounting means also providing a fixed reference for the upward movement of said scanner;
    linkage means for coupling said scanner to said mounting means, said linkage means holding said scanner stationary in longitudinal and transverse directions and allowing downward-upward movement of said scanner;
    paper guide means operatively coupled to said scanner for maintaining a fixed distance between said scan head and a sheet of paper being scanned; and
    means for dampening the downward and upward movement of the scanner as the sheets of paper are being scanned, wherein said paper guide means, said linkage means and said mounting means cooperatively control movement of said scanner whereby said scan head remains parallel to the paper path and is a fixed distance from the sheet when the sheet is being scanned.

* * * * *